(12) United States Patent
Areh et al.

(10) Patent No.: US 6,681,687 B2
(45) Date of Patent: Jan. 27, 2004

(54) CENTRIFUGAL JUICE EXTRACTOR

(75) Inventors: Marko Areh, Radlje Ob Dravi (SI); Stanislav Mazej, Gomilsko (SI); Jurij Pesec, Petrovce (SI)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 10/260,642

(22) Filed: Sep. 30, 2002

(65) Prior Publication Data

US 2003/0116033 A1 Jun. 26, 2003

Related U.S. Application Data

(63) Continuation of application No. PCT/EP01/02085, filed on Feb. 23, 2001.

(30) Foreign Application Priority Data

Mar. 31, 2001 (DE) .......................... 100 16 300

(51) Int. Cl.⁷ ............................ A23N 1/00; A23N 1/02; A23L 1/00
(52) U.S. Cl. ............................ 99/511; 99/513
(58) Field of Search ........................ 99/348, 484, 489, 99/492, 493, 495, 509–513; 210/360.1, 380.1, 369; 241/36, 37.5, 92, 282.1; 366/197, 199, 205, 601; 494/36, 43, 56, 58; 426/643, 615, 616, 495, 533, 481, 489, 478

(56) References Cited

U.S. PATENT DOCUMENTS 4,119,542 A * 10/1978 Yamaoka et al. ......... 99/512 X
6,397,736 B1 * 6/2002 Tseng ...................... 99/511

FOREIGN PATENT DOCUMENTS

DE  2 061 415     5/1972
DE  25 46 661     4/1976
DE  44 28 922 A1  2/1996

* cited by examiner

Primary Examiner—Timothy F. Simone
(74) Attorney, Agent, or Firm—Laurence A. Greenberg; Werner H. Stemer; Gregory L. Mayback

(57) ABSTRACT

A centrifugal juice extractor includes a rotary drum, a friction disk rotating along with the drum, a perforated basket that can be inserted into the drum, and a collecting space for collecting the squeezed juice. The squeezed juice can be directed specifically to the collecting space in that a channelling device that engages over the drum at its top drum border is provided on the perforated basket.

26 Claims, 2 Drawing Sheets

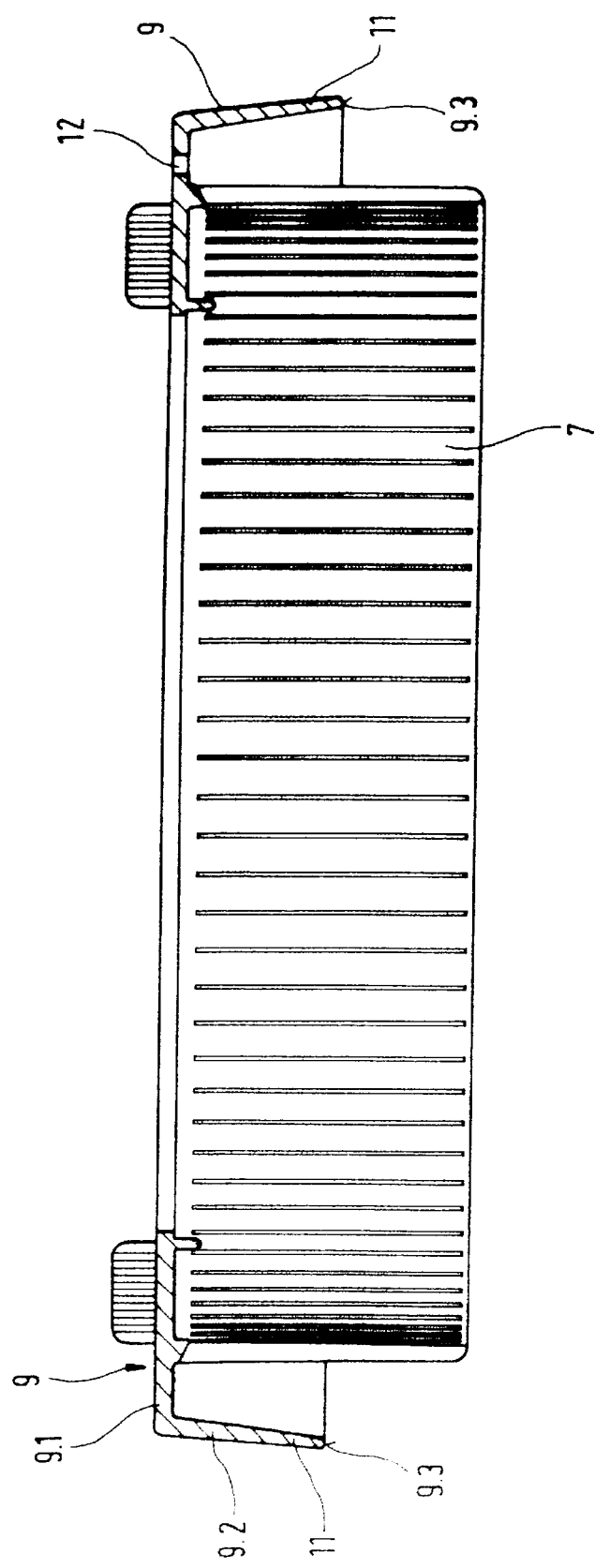

CENTRIFUGAL JUICE EXTRACTOR

CROSS-REFERENCE TO RELATED APPLICATION

This application is a continuation of copending International Application No. PCT/EP01/02085, filed Feb. 23, 2001, which designated the United States and was not published in English.

BACKGROUND OF THE INVENTION

Field of the Invention

The invention relates to a centrifugal juice extractor having a rotary drum with a loading opening, a friction disk rotating along with the drum, a perforated basket inserted into the drum, and a collecting space for collecting the squeezed juice.

In the case of a commercially available centrifugal juice extractor, a perforated basket is inserted into the rotary drum, and a friction disk that rotates along with the drum is disposed on the base of the drum. The perforated basket has a horizontally projecting peripheral border, which projects radially outward beyond the drum at its top drum border. As a result, during juice extraction, the juice is also centrifuged radially outward against the housing of the centrifugal juice extractor and, then, runs down the housing wall into the collecting space.

SUMMARY OF THE INVENTION

It is accordingly an object of the invention to provide a centrifugal juice extractor overcomes the hereinaforementioned disadvantages of the heretofore-known devices of this general type and that channels the squeezed juice away specifically to the collecting space.

With the foregoing and other objects in view, there is provided, in accordance with the invention, a centrifugal juice extractor, including a rotary drum having a drum wall with a free border defining a loading opening, the drum wall defining a collecting space for collecting juice, a friction disk connected to the drum and rotating along with the drum, a perforated basket adapted to be inserted into the drum, and a channelling device engaged over the free border of the drum, the channelling device feeding juice to the collecting space.

In accordance with another feature of the invention, a channelling device engages over the free border of the drum and feeds the squeezed juice to the collecting space. By virtue of the channelling device, the juice passing out of the drum is deflected specifically to the collecting space. Such a configuration considerably reduces the outlay for cleaning the centrifugal juice extractor following the juice-extracting operation.

In accordance with a further feature of the invention, there is provided a mixing bowl defining a collecting space, the rotary drum, the perforated basket, and the channelling device adapted to be disposed in the mixing bowl, the channelling device directing squeezed juice from the collecting space of the rotary drum to the collecting space of the mixing bowl.

In accordance with an added feature of the invention, the channelling device is particularly straightforward and cost-effective to produce if the channelling device is configured as a covering with a skirt-like continuation directed into the collecting space.

In accordance with an additional feature of the invention, the squeezed juice is deflected particularly reliably and specifically into the collecting space if the continuation has its free end extending at least more or less halfway along the height of the drum.

In accordance with yet another feature of the invention, because the continuation and the covering enclose between them an angle of greater than 90°, the operation of channelling away the juice out of the drum is also particularly promoted as a result of the active centrifugal force.

In accordance with yet a further feature of the invention, the draining edge at the free end of the continuation ensures that the squeezed juice drains quickly from the continuation, which serves as the deflecting wall.

In accordance with yet an added feature of the invention, the covering is disposed on the perforated basket.

In accordance with yet an additional feature of the invention, the covering, the perforated basket, and the continuation are formed in one piece.

In accordance with again another feature of the invention, the covering is secured in a rotationally fixed and form-fitting manner on the perforated basket.

In accordance with again a further feature of the invention, a rotationally fixed coupling, between the perforated basket and the drum, which withstands even high forces is achieved by providing the perforated basket, in the region of the cap border, with at least one plug-through opening, by which it can be plugged onto a stub that is disposed on the drum border and projects axially beyond the same.

With the objects of the invention in view, there is also provided a centrifugal juice extractor, including a rotary drum having a loading opening and a free border, a friction disk rotating along with the drum for comminuting items to be juiced, a perforated basket adapted to be inserted into the drum, the perforated basket having a collecting space for collecting juice, and a channelling device engaging over the free border of the drum and feeding juice to the collecting space.

With the objects of the invention in view, there is also provided a centrifugal juice extracting machine, including a drive unit, a mixing bowl defining a bowl collecting space, a rotary drum having a drum wall with a free border defining a loading opening, the drum wall defining a drum collecting space for collecting juice, the drum adapted to be rotatably disposed in the bowl, a driveshaft connected to the drive unit and to the drum for rotating the drum, a friction disk connected to the drum and rotating along with the drum for comminuting items to be juiced, a perforated basket adapted to be inserted into the drum and to rotate with the drum, and a channelling device engaged over the free border of the drum, rotating with the drum, and directing juice from the drum collecting space to the bowl collecting space.

Other features that are considered as characteristic for the invention are set forth in the appended claims.

Although the invention is illustrated and described herein as embodied in a centrifugal juice extractor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 2 is a cross-sectional view of a perforated basket for the centrifugal juice extractor of FIG. 1.

DESCRIPTION OF THE PREFERRED EMBODIMENTS

Figure 1:
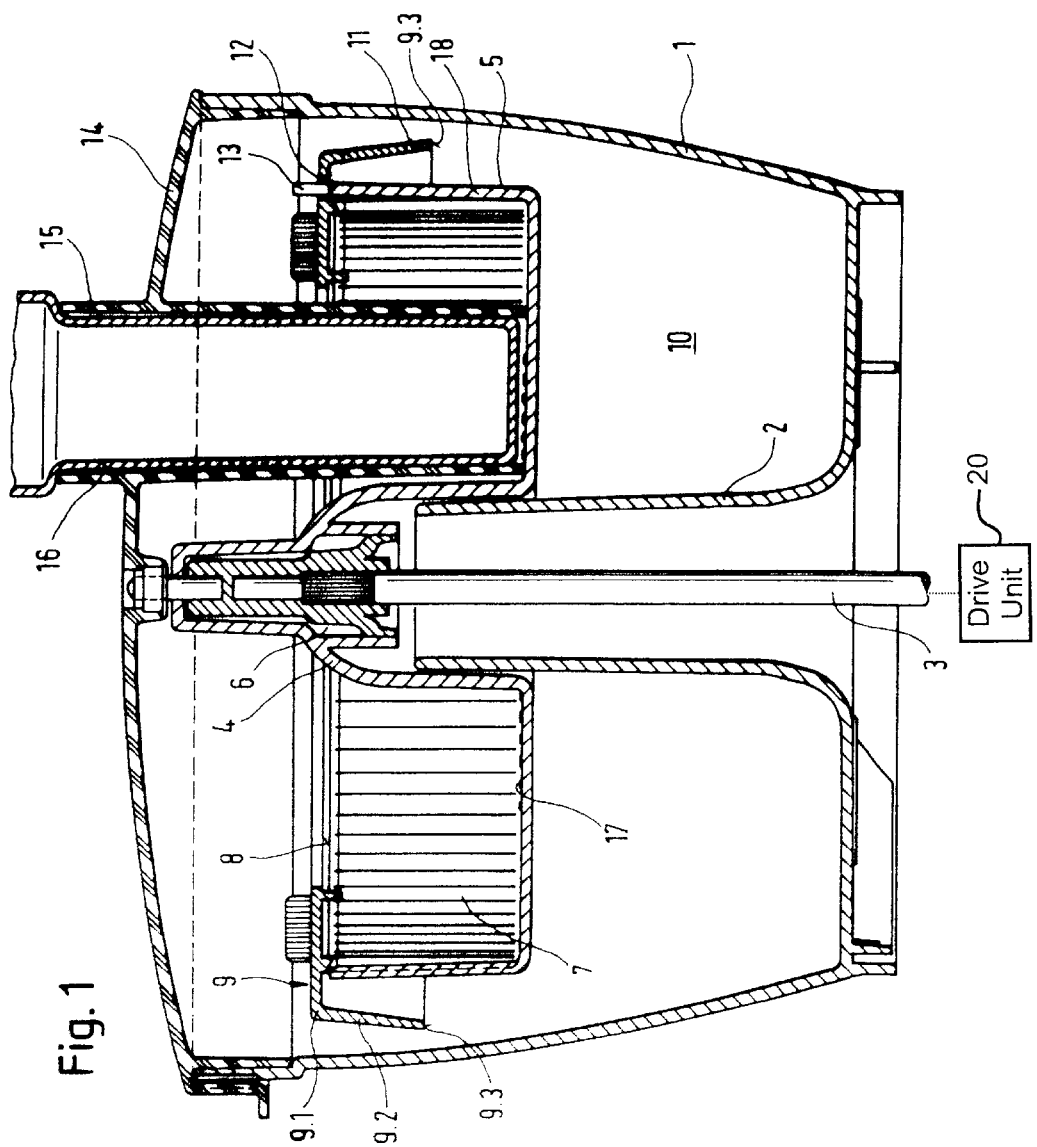
FIG. 1 is a fragmentary, cross-sectional view of a centrifugal juice extractor inserted into the mixing bowl of a food processor according to the invention.

Referring now to the figures of the drawings in detail and, particularly to FIGS. 1 and 2 thereof, there is shown a mixing bowl 1 of a food processor, which has a central tubular connector 2 through which an output shaft 3 is led out upward. The output shaft 3 is driven by a drive motor 20 of the food processor beneath the base of the mixing bowl 1. A drum 5 provided with a hub part 4 is plugged onto that end of the output shaft 3 that projects out of the connector 2 and is provided with an outer groove formation. For such a purpose, the hub part 4, in a plug-on opening 6, has an inner groove formation that matches the outer groove formation of the output shaft 3. The groove formation causes the drum to be coupled in a rotationally fixed manner to the output shaft 3.

Inserted into the drum 5 is a perforated basket 7 that is provided with a channelling device 9 that engages over the top drum border 8 and is oriented toward the collecting space 10 provided on the base of the mixing bowl 1. The channelling device 9 is integrally formed on the perforated basket 7 and, like the basket 7, is formed from plastic injection molding. The channelling device 9 has an annular covering 9.1, which can be placed in position on the perforated basket 7, and a continuation 9.2, which is integrally formed on the covering and of which the free end 11, which projects into the collecting space 10, has a draining edge 9.3.

The skirt-like continuation 9.2 and the covering 9.1 enclose between them an angle α of greater than 90°, with the result that the continuation 9.2 widens conically in the direction of its free end 11.

At least one plug-through opening 12 is provided in the region of the covering 9.1. By the plug-through opening 12, the perforated basket 7 is plugged onto a stub 13 that projects upward from the drum border 8. As a result, the perforated basket 7 is coupled in a form-locking manner to the drum 5 and, even in the case of high opposing forces, is carried along by the drum 5 as the drum 5 rotates. A form-locking connection is one that connects two elements together due to the shape of the elements themselves, as opposed to a force-locking connection, which locks the elements together by force external to the elements.

Placed in position on the mixing bowl 1 is a lid 14, which contains a feed shaft 15. Articles that are introduced into the feed shaft 15, and are to have the juice extracted from them, are pressed, by a tamper 16, against a friction disk 17 (which is disposed on the base of the drum 5 and rotates along with the drum 5) and are comminuted by the friction disk 17. As a result of the centrifugal force, the juice released during the comminuting operation is directed radially outward against the drum wall 18 and is then guided upward along the latter. The guiding likewise takes place under the influence of centrifugal force. It is advantageous if the drum wall 18 is widened conically in the direction of its top drum border 8, because, in such a case, the centrifugal force is more effective. The juice directed upward along the drum wall 18 then comes into contact with the horizontally disposed covering 9.1 of the channelling device 9 and, finally, passes to the continuation 9.2 of the channelling device 9, the continuation being oriented toward the collecting space 10. As a result of the continuation 9.2 running conically in this region, the juice, in turn, by the action of centrifugal force, is conveyed to the free end 11 of the continuation 9.2 and centrifuged from there into the collecting space 10.

The channelling device 9, overall, prevents the squeezed juice from being centrifuged in an uncontrolled manner. As a result, pronounced soiling of the mixing-bowl wall is avoided. The lid 14 is kept completely free of the squeezed juice. This means that it is also no longer possible for the juice to drip off when the lid 14 is removed from the mixing bowl 1. If the lid 14 is of a transparent material, the view into the mixing bowl 1 is maintained at all times during the juice-extracting operation because no juice sprays onto the lid 14.

We claim:

1. A centrifugal juice extractor, comprising:
    a rotary drum having a drum wall with a free border defining a loading opening, said drum wall defining a collecting space for collecting juice;
    a friction disk connected to said drum and rotating along with said drum;
    a perforated basket adapted to be inserted into said drum; and
    a channelling device engaged over said free border of said drum, said channelling device feeding juice from said collecting space.

2. The centrifugal juice extractor according to claim 1, including a mixing bowl defining a collecting space, said rotary drum, said perforated basket, and said channelling device adapted to be disposed in said mixing bowl, said channelling device directing squeezed juice from said collecting space of said rotary drum to said collecting space of said mixing bowl.

3. The centrifugal juice extractor according to claim 1, wherein said channelling device is a covering with a skirt-shaped continuation directed into said collecting space.

4. The centrifugal juice extractor according to claim 3, wherein:
    said drum has a height; and
    said continuation has a free end extending approximately halfway along said height of said drum.

5. The centrifugal juice extractor according to claim 3, wherein:
    said drum has a height; and
    said continuation extends approximately halfway along said height of said drum.

6. The centrifugal juice extractor according to claim 3, wherein said continuation and said covering enclose said drum at an angle greater than 90°.

7. The centrifugal juice extractor according to claim 3, wherein said continuation is angled greater than 90° with respect to said covering.

8. The centrifugal juice extractor according to claim 3, wherein said continuation has a draining edge.

9. The centrifugal juice extractor according to claim 3, wherein said covering is disposed on said perforated basket.

10. The centrifugal juice extractor according to claim 8, wherein said covering, said perforated basket and said continuation are formed in one piece.

11. The centrifugal juice extractor according to claim 3, wherein said covering is secured in a rotationally fixed and form-fitting manner on said perforated basket.

12. The centrifugal juice extractor according to claim 1, wherein:

said perforated basket has cap border and at least one plug-through opening in a region of said cap border;

a stub is disposed on said free border and axially projects away tram said free border; and said at least one plug-through opening is removably plugged onto said stub.

13. The centrifugal juice extractor according to claim 1, wherein:

said perforated basket has an upper border and at least one plug-through opening in a region of said cap border; and a stub axially projects away from said free border and removably secures said channelling device to said perforated basket when said channelling device is placed at said perforated basket.

14. A centrifugal juice extracting machine, comprising:

a drive unit;

a mixing bowl defining a bowl collecting space;

a rotary drum having a drum wall with a free border defining a loading opening, said drum wall defining a drum collecting space for collecting juice, said drum adapted to be rotatably disposed in said bowl;

a driveshaft connected to said drive unit and to said drum for rotating said drum;

a friction disk connected to said drum and rotating along with said drum for comminuting items to be juiced;

a perforated basket adapted to be inserted into said drum and to rotate with said drum; and a channelling device engaged over said free border of said drum, rotating with said drum, and directing juice from said drum collecting space to said bowl collecting space.

15. The centrifugal juice extractor according to claim 14, wherein said rotary drum, said perforated basket, and said channelling device are adapted to be disposed in said mixing bowl.

16. The centrifugal juice extractor according to claim 14, wherein said channelling device is a covering with a skirt-shaped continuation directed into said bowl collecting space.

17. The centrifugal juice extractor according to claim 16, wherein:

said drum has a height, and said continuation has a free end extending approximately halfway along said height of said drum.

18. The centrifugal juice extractor according to claim 16, wherein:

said drum has a height; and said continuation extends approximately halfway along said height of said drum.

19. The centrifugal juice extractor according to claim 16, wherein said continuation and said covering enclose said drum at an angle greater than 90°.

20. The centrifugal juice extractor according to claim 16, wherein said continuation is angled greater than 90° with respect to said covering.

21. The centrifugal juice extractor according to claim 16, wherein said continuation has a draining edge.

22. The centrifugal juice extractor according to claim 16, wherein said covering is disposed on said perforated basket.

23. The centrifugal juice extractor according to claim 21, wherein said covering, said perforated basket and said continuation are formed in one piece.

24. The centrifugal juice extractor according to claim 17, wherein said covering is secured in a rotationally fixed and form-fitting manner on said perforated basket.

25. The centrifugal juice extractor according to claim 14 wherein:

said perforated basket has cap border and at least one plug-through opening in a region of said cap border;

a stub is disposed on said free border and axially projects away from said free border; and said at least one plug-through opening is removably plugged onto said stub.

26. The centrifugal juice extractor according to claim 14, wherein:

said perforated basket has an upper border and at least one plug-through opening in a region of said cap border; and a stub axially projects away from said free border and removably secures said channelling device to said perforated basket when said channelling device is placed at said perforated basket.

* * * * *